Aug. 31, 1926.

F. C. GRANT

HARD GREASE CUP

Filed Jan. 8, 1925

1,598,436

Inventor
Fred C. Grant
By J. Hum Talbert
His Atty.

Patented Aug. 31, 1926.

1,598,436

UNITED STATES PATENT OFFICE.

FRED C. GRANT, OF SANGERVILLE, MAINE.

HARD-GREASE CUP.

Application filed January 8, 1925. Serial No. 1,238.

The present invention has for its purpose to provide, in a hard grease cup, a simple and comparatively inexpensive construction of cup for use in holding and feeding hard grease to parts to be lubricated.

The present grease cup is an improvement on the grease cup set forth, illustrated and claimed in patent to Fred C. Grant, No. 1,450,773, dated April 3, 1923, wherein the forcible advancement of the lubricant by means of a plunger or follower is necessary to feed the same to the journal or other part to be lubricated.

In the aforementioned patent, the casing or body of the cup contains a removable and reversible sleeve telescopically fitting the casing, with the plunger threaded in the sleeve. In this construction, when refilling the cup, the cover or cap is removed, the sleeve withdrawn with the plunger and its stem, the stem is detached and then reconnected to the plunger on its opposite face, the sleeve being again filled with grease from its opposite end and inserted in the casing, and the plunger is then operated to feed the grease from the cup.

In the present grease cup, it is another purpose to eliminate the use of the sleeve, and to employ an open-ended casing internally threaded for the plunger, there being caps or covers for both ends of the casing, the casing being reversible each time the cup is refilled.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:—

Figure 1:
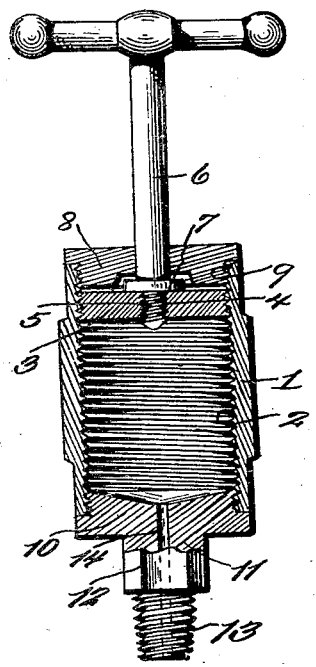
Figure 1 is a vertical sectional view through the improved hard grease cup constructed in accordance with the invention, showing the plunger in a raised position in full lines and in an advanced position in dotted lines.
Figure 2:
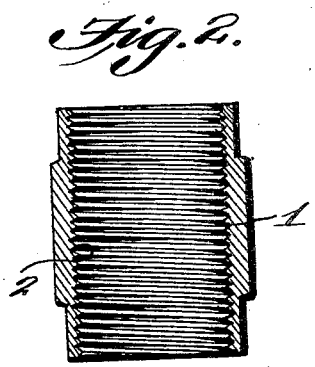
Figure 2 is a sectional view through the casing with both caps removed.
Figure 3:
Figure 3 is a detail view of the plunger.

Referring to the drawings, 1 designates an open-ended casing which is internally threaded, as at 2, and 3 is a plunger threaded to engage with the threads of the casing. The plunger has a central opening 4 which is threaded to receive the reduced end 5 of the stem 6, there being a shoulder or collar 7 which frictionally engages with the face of the plunger to limit the stem in its connection to the plunger when rotating the stem.

The stem 6 engages loosely through a cap 8 which is threaded at 9 to fit either end of the casing. The stem has a handle by which it may be rotated to feed the plunger through the casing, which plunger forcibly advances the grease to the part to be lubricated.

A second cap 10 is provided and is threaded to engage either end of the casing. The cap 10 has an extension 11 consisting of a hexagonal portion 12 and a threaded reduced part 13 which threads into the wall of a bearing to be lubricated. The cap 10 has an outlet passage 14 which is formed through the extension of the cap and through which the hard grease feeds to reach the parts to be lubricated.

In refilling the grease cup subsequently to the plunger having been fully advanced to one end, it is necessary to unscrew the stem from the plunger, then the cap 8 is unscrewed and detached and the stem withdrawn. The casing is then filled with hard grease and then the cap 10 is detached and threaded to the end of the casing through which the casing has been filled, then the cap 8 is threaded to the opposite end of the casing and the stem reconnected to the opposite face of the plunger, after which the plunger may be fed through the casing for the purpose of advancing the grease through the passage 14.

The invention having been set forth, what is claimed is:—

A grease cup consisting of an open ended casing, terminal covers selectively attachable to either end thereof, a plunger having an operative connection with the casing for positive movement from one end to the other, and a stem having a reduced threaded portion centrally engaged with the plunger adapted for threaded engagement with either side of said plunger and a shouldered portion abutting the plunger, the stem being provided with a turning handle and being loosely mounted in one of said covers.

In testimony whereof he affixes his signature.

FRED C. GRANT.